United States Patent
Xing (10) Patent No.: US 12,457,563 B2
(45) Date of Patent: Oct. 28, 2025

(54) METHOD FOR CONTROLLING TRANSMITTING POWER, TERMINAL DEVICE AND NETWORK DEVICE

(71) Applicant: GUANGDONG OPPO MOBILE TELECOMMUNICATIONS CORP., LTD., Dongguan (CN)

(72) Inventor: Jinqiang Xing, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 296 days.

(21) Appl. No.: 17/730,635

(22) Filed: Apr. 27, 2022

(65) Prior Publication Data
US 2022/0256479 A1  Aug. 11, 2022

Related U.S. Application Data

(63) Continuation of application No. PCT/CN2020/083358, filed on Apr. 3, 2020.

(51) Int. Cl.
*H04W 52/36* (2009.01)
(52) U.S. Cl.
CPC .................. *H04W 52/36* (2013.01)
(58) Field of Classification Search
CPC ............... H04W 52/36; H04W 52/18
See application file for complete search history.

(56) References Cited

U.S. PATENT DOCUMENTS

| 8,831,528 B2 * | 9/2014 | Shi ...................... H04W 52/288 455/67.11 |
| 2012/0172079 A1 * | 7/2012 | Baldemair .......... H04W 52/367 455/522 |
| 2013/0316758 A1 * | 11/2013 | Uchino ................. H04W 28/18 455/522 |
| 2014/0370929 A1 | 12/2014 | Khawand et al. |
| 2019/0200365 A1 * | 6/2019 | Sampath ............... H04B 17/318 |
| 2020/0022094 A1 * | 1/2020 | You ....................... H04W 72/21 |

FOREIGN PATENT DOCUMENTS

| CN | 102083129 A | 6/2011 | |
| CN | 103270799 A | 8/2013 | |
| CN | 110225575 A | 9/2019 | |
| WO | WO-2012061582 A1 * | 5/2012 | ........... H04W 52/18 |
| WO | 2019218112 A1 | 11/2019 | |

OTHER PUBLICATIONS

The Second Office Action from corresponding Chinese Application No. CN202210089930.3 dated Jul. 20, 2023. English translation attached.

(Continued)

*Primary Examiner* — Keith Ferguson
(74) *Attorney, Agent, or Firm* — Sheppard, Mullin, Richter & Hampton LLP (57) ABSTRACT

The present disclosure relates to a method for controlling transmitting power, a terminal device and a network device. The method includes: transmitting, by a terminal device, first information to a network device when a predetermined condition is met. The first information includes a power back-off value.

17 Claims, 4 Drawing Sheets

S101 transmitting, by the terminal device, first information to a network device when a predetermined condition is met, wherein the first information comprises a power back-off value and/or a maximum uplink duty cycle capacity of the terminal device (56) References Cited

OTHER PUBLICATIONS

International Search Report and Written Opinion dated Jan. 4, 2021 in International Application No. PCT/CN2020/083358. English translation attached.
Interdigital, "PHR Triggering for SAR", 3GPP TSG RAN WG2 #72-bis R2-110220, Jan. 21, 2011, full text.
3rd Generation Partnership Project; Technical Specification Group Radio Access Network; NR; Medium Access Control (MAC) protocol specification (Release 15); 3GPP TS 38.321, V15.0.0 (Dec. 2017).
Extended European Search Report dated Oct. 4, 2022 received in European Patent Application No. EP 20929514.6.
OPPO, "Email discussion summary for RAN4# 94e_#2 0_NR_RF_FR2_req_enh_Part_1 ", 3GPP Draft; R4-2002889 , 3RD Generation Partnership Project (3GPP) , Mobile Competence Centre ; 650 , Route Des Lucioles ; F-06921 Sophia-Antipolis Cedex ; France vol. RAN WG4 , No. Electronic Meeting; Feb. 24, 2020-Mar. 6, 2020 Mar. 10, 2020 (Mar. 10, 2020) , XP051863751.
Interdigitalinc: "Pre-emptive solution for MPE issues mitigation" , 3GPP Draft; R4-1913690 , 3RD Generation Partnership Project (3GPP) , Mob Ile Competence Centre ; 650 , Route Des Lucioles ; F-06921 Sophia-Antipolis Cedex ; France vol. RAN WG4 , No. Reno , NV, USA; Nov. 18, 2019-Nov. 22, 2019 Nov. 8, 2019 (Nov. 8, 2019) , XP051818229.
First Examination Report dated Nov. 18, 2022 received in Indian Patent Application No. IN202227030704.
First Office Action from corresponding Chinese Application No. 202210089930.3, dated Apr. 21, 2023. English translation attached.
Communication pursuant to Article 94(3) EPC for European application 20929514.6 mailed Jun. 20, 2023.
Ericsson et al: "P-MPR reporting for MPE enhancement", 3GPP Draft: R4-2001324. 3RD Generation Partnership Project (3GPP), Mobile Competence Centre ; 650, Route Des Lucioles : F-06921 Sophia-Antipolis Cedex : France vol. RAN WG4, No. Electronic meeting; Feb. 24, 2020-Mar. 6, 2020 Feb. 14, 2020 (Feb. 14, 2020) , XP051851249.
The Rejection Decision from corresponding Chinese Application No. 202210089930.3, dated Oct. 23, 2023. English translation attached.
The Reexamination notice from corresponding Chinese Application No. 202210089930.3, dated Jul. 26, 2024.
The Reexamination Decision from corresponding Chinese Application No. 202210089930.3, dated Sep. 13, 2024.
The Grant Notice from corresponding Chinese Application No. 202210089930.3, dated Sep. 29, 2024.

* cited by examiner

FIG. 1

S101 transmitting, by the terminal device, first information to a network device when a predetermined condition is met, wherein the first information comprises a power back-off value and/or a maximum uplink duty cycle capacity of the terminal device

FIG. 2

S201 receiving, by the network device, first information transmitted by a terminal device, wherein the first information comprises a power back-off value and/or a maximum uplink duty cycle capacity of the terminal device

METHOD FOR CONTROLLING TRANSMITTING POWER, TERMINAL DEVICE AND NETWORK DEVICE

CROSS-REFERENCE TO RELATED APPLICATIONS

The present application is a continuation of International Application No. PCT/CN2020/083358 filed on Apr. 3, 2020, which is hereby incorporated by reference in its entirety.

TECHNICAL FIELD

The present disclosure relates to the field of communications, and more particularly, to a method for controlling transmitting power, a terminal device and a network device.

BACKGROUND

Generally, in order to prevent a terminal device, such as a mobile phone, that radiates electromagnetic waves from causing harm to human body, an electromagnetic radiation value of the terminal device needs to meet strict index requirements. An electromagnetic radiation index includes a Specific Absorption Rate (SAR) and a Maximum Permissible Emission (MPE). For example, for a terminal device communicating at a frequency band below 6 GHz, SAR cannot exceed a preset limit value. For a terminal device communicating at a frequency band above 6 GHz, MPE cannot exceed a preset limit value.

The terminal device generally prevents SAR or MPE from exceeding a limit value by reducing a transmitting power. However, reducing the transmitting power tends to cause a communication link of the terminal device to be interrupted.

SUMMARY

In view of this, embodiments of the present disclosure provide a method for controlling transmitting power, a terminal device, and a network device, which can be used to optimize a control mechanism of transmitting power.

An embodiment of the present disclosure provides a method for controlling transmitting power. The method is applied in a terminal device, and includes: transmitting, by the terminal device, first information to a network device when a predetermined condition is met. The first information includes a power back-off value.

An embodiment of the present disclosure further provides a terminal device. The terminal device includes: a processor and a memory. The memory is configured to store a computer program, and the processor is configured to invoke and execute the computer program stored in the memory to perform the method for controlling transmitting power as described above.

An embodiment of the present disclosure further provides a network device. The network device includes: a processor and a memory. The memory is configured to store a computer program, and the processor is configured to invoke and execute the computer program stored in the memory to perform operations. The operations include: receiving, by the network device, first information transmitted by a terminal device when a predetermined condition is met. The first information comprises a power back-off value.

DESCRIPTION OF EMBODIMENTS

Technical solutions according to embodiments of the present disclosure will be described below in combination with accompanying drawings of the embodiments of the present disclosure.

The technical solutions according to the embodiments of the present disclosure can be applied to various communication systems, such as a Global System of Mobile (GSM) communication system, a Code Division Multiple Access (CDMA) system, a Wideband Code Division Multiple Access (WCDMA) system, a General Packet Radio Service (GPRS), a Long Term Evolution (LTE) system, an Advanced Long Term Evolution (LTE-A) system, a New Radio (NR) system, an evolution system of the NR system, an LTE-based access to unlicensed spectrum (LTE-U) system, an NR-based access to unlicensed spectrum (NR-U) system, an Non-Terrestrial Networks (NTN) system, a Universal Mobile Telecommunication System (UMTS), a Wireless Local Area Networks (WLAN), Wireless Fidelity (WiFi), a 5th-Generationn (5G) system, or other communication systems, etc.

Generally speaking, conventional communication systems support a limited number of connections and are easy to implement. However, with the development of communication technologies, mobile communication systems will not only support conventional communication, but also will support, for example, Device to Device (D2D) communication, Machine to Machine (M2M) communication, Machine Type Communication (MTC), and Vehicle to Vehicle (V2V) communication, or Vehicle to everything (V2X) etc. The embodiments of the present disclosure may also be applied to these communication systems.

In at least one embodiment, the communication system according to an embodiment of the present disclosure may be applied to a Carrier Aggregation (CA) scenario, a Dual Connectivity (DC) scenario, and a Standalone (SA) network deployment scenario.

Various embodiments are described in combination with a network device and a terminal device. The terminal device may also be referred to as a User Equipment (UE), an access terminal, a user unit, a user station, a mobile station, a mobile platform, a remote station, a remote terminal, a mobile device, a user terminal, a terminal, a wireless communication device, a user agent, or a user device.

The terminal device may be a STATION (ST) in a WLAN, and may be a cellular phone, a cordless phone, a Session Initiation Protocol (SIP) phone, a Wireless Local Loop (WLL) station, a Personal Digital Assistant (PDA), a handheld device having a wireless communication function, a computing device or another processing device connected to a wireless modem, a vehicle-mounted device, a wearable device, a terminal device in a next generation communication system such as an NR Network, or a terminal device in a future evolved Public Land Mobile Network (PLMN) Network, and the like.

In the embodiments of the present disclosure, the terminal device may be deployed on land, including indoor or outdoor, handheld, wearable or vehicle-mounted terminal devices; may also be deployed on water (such as on a ship and the like); and may also be deployed on air (e.g., on airplanes, balloons, satellites, etc.).

In the embodiments of the present disclosure, the terminal device may be a Mobile Phone, a tablet personal computer (Pad), a computer with a wireless transceiver function, a Virtual Reality (VR) terminal device, an Augmented Reality (AR) terminal device, a wireless terminal device in industrial control, a wireless terminal device in self driving, a wireless terminal device in remote medical treatment, a wireless terminal device in smart grid, a wireless terminal device in transportation safety, a wireless terminal device in smart city, a wireless terminal device in smart home, or the like.

As an example and not a limitation, in the embodiments of the present disclosure, the terminal device may also be a wearable device. The wearable device may also be called a wearable intelligent device, which is a general term for wearable devices obtained through intelligence design and development on daily wears by applying wearable technology, such as glasses, gloves, wrist-watch, dress and shoes. The wearable device may be worn directly on the body or may be a portable device integrated into a user's clothing or accessory. The wearable device is not only a hardware device, but also realizes powerful functions through software support, data interaction and cloud interaction. In a broad sense, the wearable smart devices include those which have full functions and a large size, and can realize all or partial functions without depending on a smart phone, for example, smart watches, smart glasses and the like, and include those which only focus on a certain type of application function, and need to be used along with other device such as a smart phone, such as various smart bracelets, smart jewelry and the like for physical sign monitoring.

In the embodiments of the present disclosure, the network device may be a device for communicating with a mobile device, and the network device may be an Access Point (AP) in a WLAN, a Base Transceiver Station (BTS) in GSM or CDMA, a NodeB (NB) in WCDMA, an Evolutional Node B (eNB, or eNodeB) in LTE, a relay Station or an Access Point, or a vehicle-mounted device, a wearable device, a network device (gNB) in an NR network, or a network device in a future evolved PLMN network, and the like.

As an example and not a limitation, in embodiments of the present disclosure, a network device may have a mobile nature, e.g., the network device may be a mobile device. Alternatively, the network device may be a satellite or a balloon station. For example, the satellite may be a Low Earth Orbit (LEO) satellite, a Medium Earth Orbit (MEO) satellite, a Geostationary Earth Orbit (GEO) satellite, a High Elliptical Orbit (HEO) satellite, or the like. Alternatively, the network device may be a base station deployed on land, water, or the like.

In the embodiments of the present disclosure, a network device may provide a service for a cell, and a terminal device communicates with the network device through a transmission resource (for example, a frequency domain resource or a spectrum resource) used by the cell. The cell may be a cell corresponding to the network device (for example, a base station), and the cell may belong to a macro base station or a base station corresponding to a Small cell. The Small cell may include: an Metro cell, an Micro cell, a Pico cell, a Femto cell, and the like. The Small cell is characterized by small coverage area and low transmitting power, and is suitable for providing high-rate data transmission services.

Figure 1:
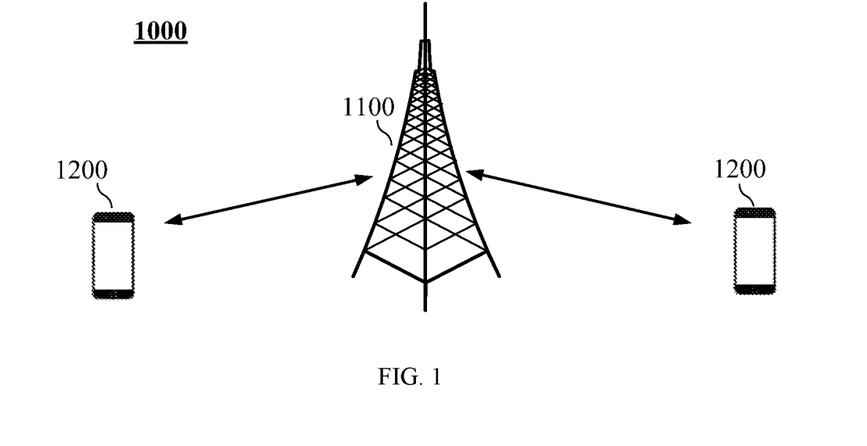
FIG. 1 is a schematic diagram illustrating a communication system architecture according to an embodiment of the present disclosure.

FIG. 1 schematically illustrates a network device 1100 and two terminal devices 1200. In at least one embodiment, a wireless communication system 1000 may include a plurality of network devices 1100, and each network device 1100 may cover a different number of terminal devices within its coverage area, which is not limited in the embodiment of the present disclosure. In at least one embodiment, the wireless communication system 1000 shown in FIG. 1 may further include other network entities such as a Mobility Management Entity (MME), an Access and Mobility Management Function (AMF), and the like, which is not limited in the embodiment of the present disclosure.

It should be understood that terms "system" and "network" in the present disclosure are often used interchangeably herein. The term "and/or" in the present disclosure only represents a relationship between correlated objects, including three relationships. For example, "A and/or B" may mean three situations: A only, B only, or both A and B. In addition, the character "/" in the present disclosure generally represents an "or" relationship between the correlated objects preceding and succeeding the symbol.

In order to clearly illustrate the concept of embodiments of the present disclosure, a brief description is first given on a control of electromagnetic radiation of a terminal.

In the embodiments of the present disclosure, a statistical electromagnetic radiation value refers to an index variable, such as SAR and MPE, for measuring electromagnetic radiation intensity of a terminal device to a human body. The statistical electromagnetic radiation value is a statistical sum of electromagnetic radiation over a certain time. The statistical electromagnetic radiation value is related to a transmitting power and a transmitting duration of the terminal device. The higher the transmitting power or the longer the transmitting duration of the terminal device, the higher the SAR and MPE.

In a case that the statistical electromagnetic radiation value will exceed a predetermined threshold value, for example, when it is determined by a distance sensor that a distance between a terminal device and a human body is smaller than a predetermined distance threshold value, the terminal device may perform a power back-off to reduce the transmitting power.

After an in-depth study, the inventor of the present disclosure has found that, in an absence of any warning information, the network device cannot determine when the terminal device will perform the power back-off, and cannot determine a power back-off value, so an adaptive adjustment cannot be performed based on the power back-off of the terminal device. In practical applications, problems also arise from this. In a case of an excessive power back-off value, the network device will not be able to receive or demodulate a signal transmitted by the terminal device, causing a communication link to be interrupted. For example, when the power back-off value is greater than 20 dB, the communication link of the terminal device with the network device will be difficult to maintain.

Figure 2:
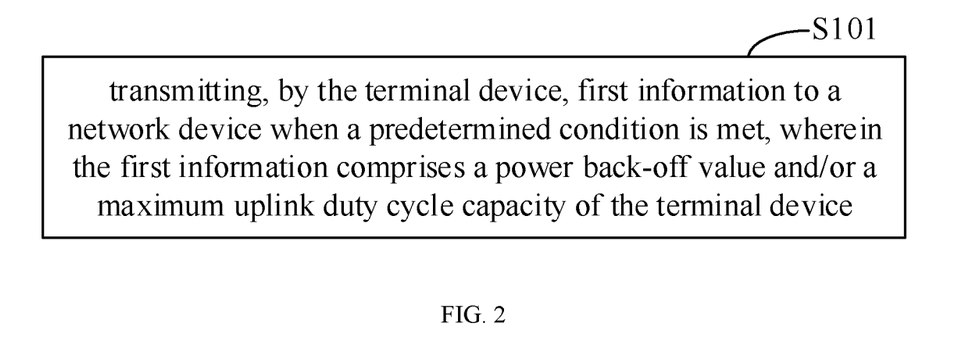
FIG. 2 is a flow chart illustrating a method for controlling transmitting power at a terminal side according to an embodiment of the present disclosure.

To this end, an embodiment of the present disclosure provides a method for controlling transmitting power, which is applied in a terminal device. As illustrated in FIG. 2, the method includes the following operation.

In block S101, the terminal device transmits first information to a network device when a predetermined condition is met. The first information includes a power back-off value and/or a maximum uplink duty cycle capacity of the terminal device.

Exemplarily, the power back-off value refers to an amount of reduction in the transmitting power of the terminal device. The maximum uplink duty cycle capacity refers to a percentage of uplink time slots on which the terminal device can be scheduled by the network device for transmission to all uplink and downlink time slots. The statistical electromagnetic radiation value may be an electromagnetic wave absorption ratio SAR and/or a maximum allowable exposure MPE.

In the embodiment of the present disclosure, the terminal device reports the power back-off value and/or the maximum uplink duty cycle capacity to the network device by transmitting the first information, so that the network device can be notified when the terminal device performs the power back-off to limit the statistical electromagnetic radiation value, and the network device can assist in avoiding an interruption of a communication link.

Figure 3:
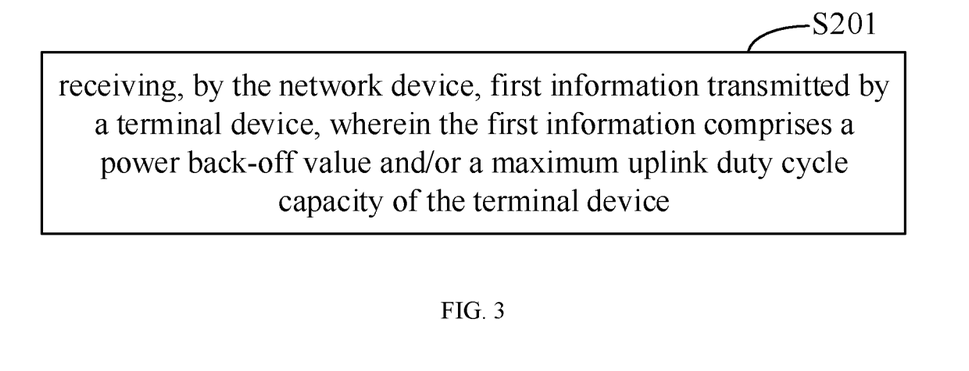
FIG. 3 is a flow chart illustrating a method for controlling transmitting power at a network side according to an embodiment of the present disclosure.

Correspondingly, an embodiment of the present disclosure further provides a method for controlling transmitting power, which is applied in a network device. As illustrated in FIG. 3, the method includes the following operation.

In block S201, the network device receives first information transmitted by a terminal device. The first information includes a power back-off value and/or a maximum uplink duty cycle capacity of the terminal device.

In the embodiment of the present disclosure, the network device receives the first information, so that an auxiliary measure, such as scheduling the transmitting power or transmitting duration of the terminal device, may be provided according to the power back-off value and/or the maximum uplink duty cycle capacity of the terminal device in the first information, so as to avoid an interruption of a communication link.

Specific implementations of embodiments of the present disclosure are described below by way of several embodiments.

Embodiment 1

In an embodiment of the present disclosure, a predetermined condition for triggering a terminal device to transmit first information to a network device includes that a statistical electromagnetic radiation value of the terminal device reaches a first threshold value, and the first information includes the power back-off value of the terminal device.

Figure 4:
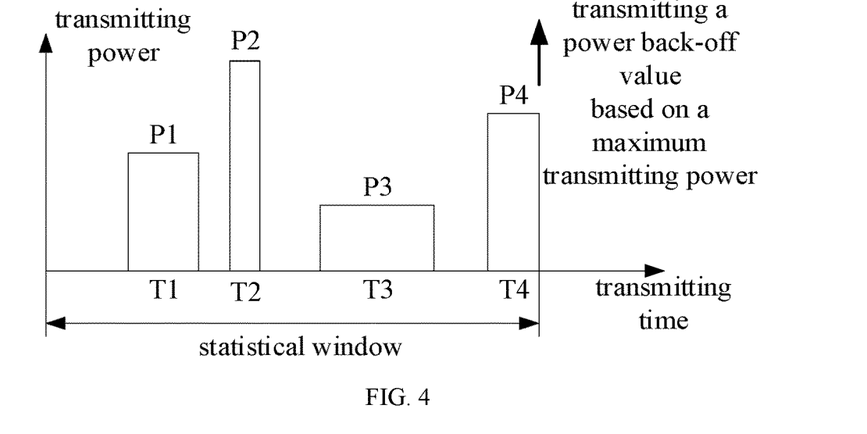
FIGS. 4 to 6 are schematic diagrams illustrating an effect of multiple uplink transmissions of a terminal device according to an embodiment of the present disclosure.

In the embodiment of the present disclosure, the statistical electromagnetic radiation value is a sum of electromagnetic radiation values of one or more uplink transmissions of the terminal device. FIG. 4 is a schematic diagram illustrating an effect of uplink transmissions in a statistical window according to an embodiment of the present disclosure. The terminal device performs 4 uplink transmissions in the statistical window, and based on a transmitting power value and a transmitting duration of each uplink transmission, may calculate a sum of electromagnetic radiation values of the 4 uplink transmissions, that is, obtain a statistical electromagnetic radiation value of the 4 uplink transmissions.

A length of the statistical window of the statistical electromagnetic radiation value may be a first predetermined length. Exemplarily, the first predetermined length is equal to a statutory time length, which refers to a unit duration required by the communication standard or regulation to calculate the statistical electromagnetic radiation value. The terminal device first determines a statistical electromagnetic radiation value in a statistical window equal to the statutory length, and then reports a power back-off value under a condition that the statistical electromagnetic radiation value reaches a first threshold value, so that the network device adjusts the scheduling of the terminal device, to limit the statistical electromagnetic radiation value in the statutory time length.

In at least one embodiment, the first threshold is smaller than or equal to a statutory threshold. The statutory threshold is a threshold that the electromagnetic radiation value of the terminal is required not to exceed in the communication standard or regulation.

The present embodiment provides the following various exemplary implementations for determining the power back-off value, which are described in detail below.

Example 1: the power back-off value is determined based on a maximum transmitting power of the terminal device.

In the embodiment of the present disclosure, the power back-off value is a power back-off value when it is assumed that the terminal device is scheduled to perform uplink transmission at the maximum transmitting power. The first information is transmitted at an end of uplink transmission when a statistical electromagnetic radiation value of the terminal device reaches a first threshold value.

Referring to FIG. 4, taking the terminal device performing 4 uplink transmissions in the statistical window as an example. It is assumed that the maximum transmitting power of the terminal device is 26 dBm, and a limit requirement of the electromagnetic radiation value of the terminal device can be satisfied when the transmitting power of the terminal device is 10 dBm. A transmitting power P4 of the terminal device for performing the 4th uplink transmission is 20 dBm, and the terminal device will adopt the power back-off. In the example, the power back-off value is determined based on the maximum transmitting power of 26 dBm. Assuming that the terminal device is scheduled to perform uplink transmission at 26 dBm next time, the power back-off value is: 26–10 dBm=16 dB.

Example 2: the power back-off value is determined based on a first transmitting power of the terminal device. The first transmitting power is a transmitting power when a statistical electromagnetic radiation value of the terminal device reaches a first threshold value.

For example, the power back-off value is a power back-off value when it is assumed that the terminal device is scheduled to perform uplink transmission at the first transmitting power. The first information is transmitted at an end of uplink transmission when the statistical electromagnetic radiation value of the terminal device reaches the first threshold value.

Figure 5:
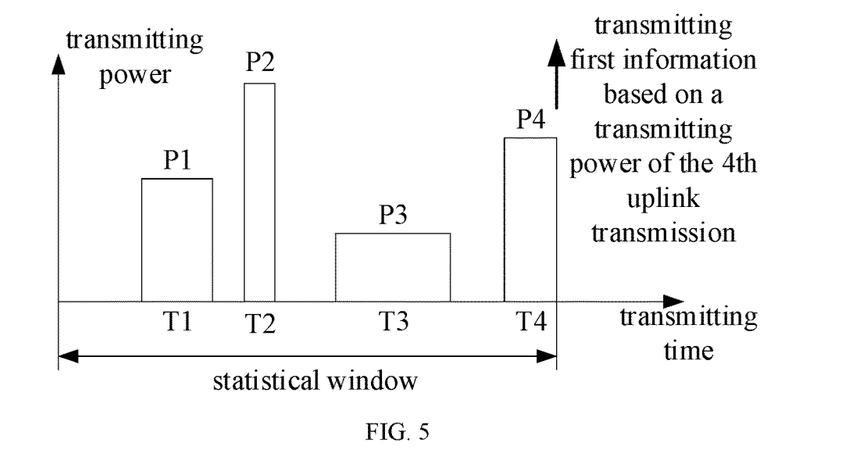

Referring to FIG. 5, taking the terminal device performing 4 uplink transmissions in the statistical window as an example. It is assumed that the maximum transmitting power of the terminal device is 26 dBm, and a limit requirement of the electromagnetic radiation value of the terminal device can be satisfied when the transmitting power of the terminal device is 10 dBm. A transmitting power P4 of the terminal device for performing the 4th uplink transmission is 20 dBm, and the terminal device will adopt the power back-off. In the example, the power back-off value is determined based on the corresponding transmitting power when the statistical electromagnetic radiation value reaches the first threshold value, that is, based on the transmitting power of 20 dBm of the 4th uplink transmission. Thus, the power back-off value is: 20 dBm−10 dBm=10 dBm.

Example 3: the power back-off value is determined based on a second transmitting power of the terminal device. The second transmitting power is a transmitting power when the terminal device is scheduled for a next uplink transmission.

Figure 6:
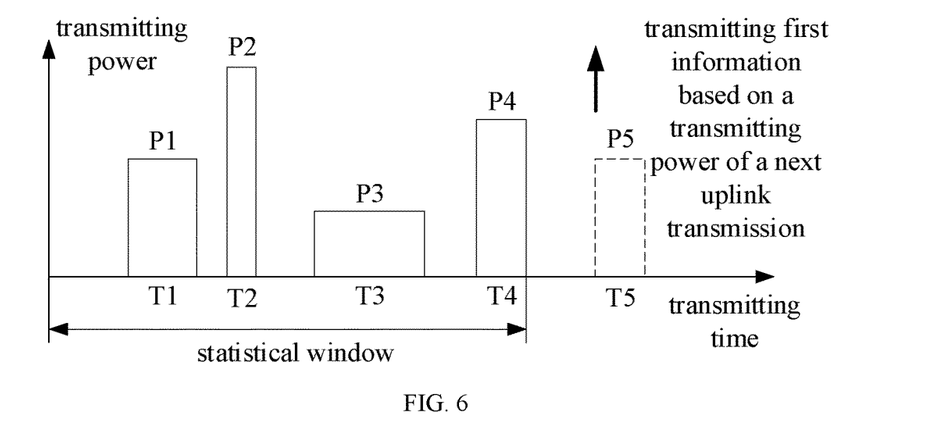

Referring to FIG. 6, taking the terminal device performing 4 uplink transmissions in the statistical window as an example. It is assumed that the maximum transmitting power of the terminal device is 26 dBm, and a limit requirement of the electromagnetic radiation value of the terminal device can be satisfied when the transmitting power of the terminal device is 10 dBm. The transmitting power P4 of the terminal device for performing the 4th uplink transmission is 20 dBm, and the terminal device will adopt the power back-off. In addition, the terminal device receives an uplink grant (UL grant) information from the network device before the 5th uplink transmission, and calculates the transmitting power P5 of the 5th uplink transmission to be 15 dB according to the UL grant. In the example, the power back-off value is determined based on the transmitting power of 15 dB for the 5th uplink transmission, and then the power back-off value is: 15 dBm−10 dBm=5 dBm.

In at least one embodiment, the terminal device transmits the first information before the next uplink transmission; or the terminal device transmits the first information at an initial time of the next uplink transmission.

For example, the first information is transmitted before the 5th uplink transmission or at an initial time of the 5th uplink transmission as illustrated in FIG. 6.

Exemplarily, when the power back-off value is greater than a first threshold value, the network device performs at least one of the following operations.

1) Scheduling the terminal device to perform a next uplink transmission at a transmitting power smaller than or equal to a safe power.
2) Reducing an uplink duty cycle for scheduling the terminal device in a next statistical window to be smaller than or equal to a safe uplink duty cycle.
3) Handing over the terminal device to a serving cell at another frequency point.

In at least one embodiment, the safe power is determined based on the power back-off value and a maximum transmitting power of the terminal device; or the safe power is determined based on the power back-off value and a first transmitting power of the terminal device, and the first transmitting power is a transmitting power when a statistical electromagnetic radiation value of the terminal device reaches a first threshold value; or the safe power is determined based on the power back-off value and a second transmitting power of the terminal device, and the second transmitting power is a transmitting power of a first uplink transmission after the statistical electromagnetic radiation value of the terminal device reaches the first threshold value.

In at least one embodiment, the safe uplink duty cycle is an uplink duty cycle capacity of the terminal device at a maximum transmitting power.

Exemplarily, the network device may not perform processing if the power back-off value is smaller than the first threshold. For example, when the power back-off value of the terminal device is greater than a certain value, for example, greater than 20 dB, a communication link may be interrupted. When the power back-off value is small, for example, smaller than 3 dB, it will not have a significant impact on the quality of the communication link. Therefore, the present embodiment provides the following exemplary implementations to reduce unnecessary reporting of the power back-off value by the terminal.

Example 4: the terminal device cancels transmission of the first information when the power back-off value is smaller than or equal to a second threshold value.

In at least one embodiment, the second threshold is predetermined or is configured by a network device. For example, the second threshold may be 3 dB, 5 dB, or another value.

Example 5: the terminal device cancels transmission of the first information when a difference value between the power back-off value and an immediately previous power back-off value transmitted by the terminal device is smaller than or equal to a third threshold value.

In at least one embodiment, the third threshold is predetermined or is configured by a network device. For example, the second threshold may be 2 dB, 3 dB, or another value.

In practical applications, even if the terminal device reports the power back-off value, the network device does not adjust responsive to the reported power back-off value during scheduling because the network device needs to consider scheduling among multiple terminal devices in a cell. Therefore, the present embodiment provides the following implementation, which can avoid wasting air interface resources by such reporting.

Example 6: the terminal device includes a first timer, and the terminal device cancels transmission of the first information when the first timer is in an activated state.

In at least one embodiment, the first timer is predetermined or is configured by a network device.

That is, during an activation period of the first timer, the terminal is not allowed to report the power back-off value, and the terminal device reports the power back-off value only when the first timer expires, so that the base station schedules the terminal according to the power back-off value, and a waste of air interface reporting resources by the terminal is avoided.

Example 7: the terminal device includes a second timer, and the terminal device transmits the first information periodically to the network device in accordance with the second timer.

In at least one embodiment, the second timer is predetermined or is configured by a network device.

That is, the terminal device reports the power back-off value to the network device periodically based on the second timer, in addition to reporting the power back-off value when the statistical electromagnetic radiation value reaches the first threshold value, so that the network device can know a current radiation level of the terminal device.

In at least one embodiment, in the periodic reporting process based on the second timer, when the power back-off is not required, the power back-off value may be reported to be 0 or not reported.

In an embodiment of the present disclosure, the terminal device may determine a statistical electromagnetic radiation value based on transmission process parameters. The transmission process parameters include transmitting power values and corresponding transmitting durations.

Exemplarily, the terminal device may calculate the statistical electromagnetic radiation value in accordance with the following equation:

$$\text{statistical electromagnetic radiation value} = \Sigma_{i=0}^{n} f(P_i) \times T_i,$$

where $f(\ )$ represents a functional relationship between a transmitting power P of the terminal device and an electromagnetic radiation value of the terminal device, T represents a statistical duration for the transmitting power P, a subscript i represents an ith transmission, $P_i$ represents a transmitting power of the ith transmission, $T_i$ represents a transmitting duration of the ith transmission, and i is a positive integer.

The transmitting power and the transmitting duration of the terminal device may be different at different time. Taking the terminal device performing 4 uplink transmissions in a statistical window as an example, the transmitting duration corresponding to the transmitting power $P_i$ is $T_i$, or the transmitting power in $T_i$ is $P_i$, and the terminal electromagnetic radiation value of the ith uplink transmission is $f(P_i) \times T_i$. The terminal electromagnetic radiation value of the terminal device in the statistical window=$f(P_1) \times T_1 + f(P_2) \times T_2 + f(P_3) \times T_3 + f(P_4) \times T_4$. When the statistical value reaches the first threshold value, the power back-off value should be reported.

The statistical window of the embodiment of the present disclosure may be a sliding window or a fixed window. Various exemplary implementations of setting the statistical window will be described below by taking the length of the statistical window being n time units as an example. The n time units may be n symbols, n slots, n subframes, n frames, n seconds, or the like.

Example 7: the statistical window is a sliding window.

In the example, two consecutive statistical windows partially overlap with each other in the time domain.

Figure 7:
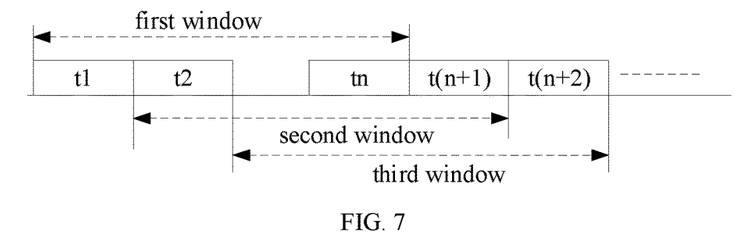
FIG. 7 is a schematic diagram illustrating a sliding statistical window according to an embodiment of the present disclosure.

Referring to FIG. 7, the terminal device calculates a statistical electromagnetic radiation value within a first window including time units t1 to tn, and determines whether to transmit the first information based on the magnitude of the statistical electromagnetic radiation value. The statistical window is then shifted forward by one time unit, resulting in the next statistical window, i.e. the second window including time units t2 to t(n+1). By analogy, the statistical window after the next statistical window is a third window including time units t3 to t(n+2).

Example 9: the statistical window is a fixed window.

In this example, two consecutive statistical windows are adjacent in the time domain.

Figure 8:
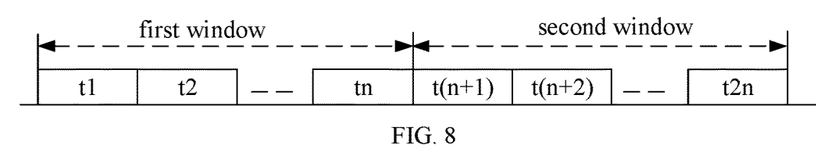
FIG. 8 is a schematic diagram illustrating a fixed statistical window according to an embodiment of the present disclosure.

Referring to FIG. 8, the terminal device calculates a statistical electromagnetic radiation value within a first window including time units t1 to tn, and determines whether to transmit the first information based on the magnitude of the statistical electromagnetic radiation value. Then, after the first window, a second window, with the same length of n time units, is used as the next statistical window, including time units t(n+1) to t2n. By analogy, the statistical window after the next statistical window includes time units t(2n+1) to tn.

In Embodiment 1 of the present disclosure, when detecting that, for example, SAR or MPE is about to exceed the threshold value, the terminal device may report the adopted power back-off value to the network device, giving an early warning to the network device, so that the network may adopt a corresponding measure to avoid a radio link failure.

Embodiment 2

In some application scenarios, when a terminal device initially accesses a network device, the terminal device may report, to the network device, a Max Uplink Duty Cycle capacity that the terminal device can support while meeting a requirement of a terminal electromagnetic radiation value on a certain frequency band, so as to provide an early warning of power back-off to the network device. The maximum uplink duty cycle capacity refers to a percentage of uplink time slots on which the terminal device can be scheduled by the network device for transmission to all uplink and downlink time slots. In the subsequent communication process, the terminal device accumulates its uplink transmitting duration in real time and determines the uplink duty cycle based on the accumulation result. And when the uplink duty cycle of the network device exceeds the maximum uplink duty cycle capacity, the terminal device performs the power back-off to reduce the terminal electromagnetic radiation value.

However, the maximum uplink duty cycle capacity reported by the terminal device is usually a static value calculated based on a fixed power, for example, based on the maximum power of the terminal device, though the transmitting power of the terminal device may be dynamically changed in practical applications. In view of this, if the network device schedules the terminal device based on the maximum uplink duty cycle capacity reported when the terminal device initially accesses the network device, the performance of the terminal device will be unnecessarily restricted. For example, if the terminal device actually adopts a low transmitting power, the transmitting duration corresponding to the maximum uplink duty cycle capacity calculated based on the actual transmitting power may be very long. And if the scheduling is based on the maximum uplink duty cycle reported by the terminal device during the initial access, the terminal device may perform the power back-off in advance.

Therefore, according to Embodiment 2 of the present disclosure, the terminal device dynamically reports the maximum uplink duty cycle capacity of the terminal device within a subsequent period of time based on a real-time monitoring of the electromagnetic radiation condition, so as to provide an early warning for the network device, assist in avoiding a wireless link failure, and improve link stability.

Specifically, in the Embodiment 2, the predetermined condition for triggering the terminal device to transmit the first information to the network device includes that that an end time of each statistical window in one or more statistical windows is reached. The first information includes the maximum uplink duty cycle capacity of the terminal device.

The maximum uplink duty cycle capacity is a maximum uplink duty cycle capacity for uplink transmission at the end time of each statistical window in the one or more statistical windows of the terminal device.

That is, for each statistical window, the terminal device transmits the maximum uplink duty cycle capacity to the network device whenever the end time of the statistical window is reached.

In at least one embodiment, the maximum uplink duty cycle capacity corresponds to a terminal electromagnetic radiation margin at an end time of a current statistical window in one or more statistical windows, and the terminal electromagnetic radiation margin is a difference value between a terminal electromagnetic radiation threshold value and a current statistical electromagnetic radiation value.

In at least one embodiment, a scheduling uplink duty cycle of the network device in a next statistical window is smaller than or equal to the maximum uplink duty cycle capacity. And the network device reasonably schedules the uplink transmission of the terminal device according to the maximum uplink duty cycle capacity reported by the terminal device, so that the scheduling uplink duty cycle in the next statistical window can be smaller than or equal to the maximum uplink duty cycle capacity.

In the embodiment of the present disclosure, the maximum uplink duty cycle capacity is updated over time, so that the terminal electromagnetic radiation value condition of the terminal device can be dynamically and timely reflected. Thus, the network device can reasonably schedule the uplink transmission of the terminal device, such that higher flexibility and better performance may be achieved, and the performance of the terminal device can be prevented from being unnecessarily restricted.

Figure 9:
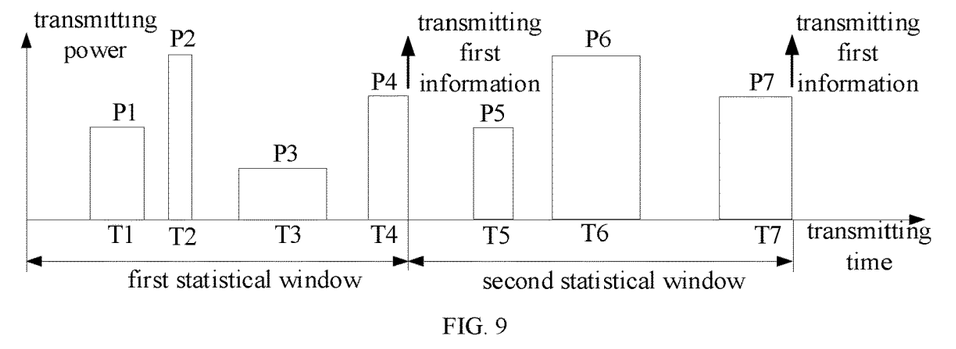
FIG. 9 is a schematic diagram illustrating an effect of multiple uplink transmissions of a terminal device in a plurality of statistical windows according to an embodiment of the present disclosure.

To more clearly illustrate a process of dynamically reporting the maximum uplink duty cycle capacity in the embodiment of the present disclosure, FIG. 9 shows a schematic diagram illustrating an effect of multiple uplink transmissions of a terminal device in a first statistical window and a second statistical window that are adjacent to each other according to an embodiment of the present disclosure.

The terminal device has uplink transmissions at time points T1 to T4 within the length of the first statistical window. Correspondingly, the terminal device may statistically obtain an electromagnetic radiation margin, for example, an SAR margin by time point T4. The terminal device can convert the SAR margin into the maximum uplink duty cycle capacity and report the maximum uplink duty cycle capacity to the network.

The maximum uplink duty cycle capacity reported may be determined according to the following exemplary method.

Method 1: the maximum uplink duty cycle capacity is determined based on the terminal electromagnetic radiation margin at the end time of the current statistical window and a maximum transmitting power of the terminal device.

Referring to FIG. 9, the terminal device performs 4 uplink transmissions within the first statistical window. The maximum uplink duty cycle capacity is determined based on the SAR margin at the end of the 4th uplink transmission and the maximum transmitting power $P_{max}$ of the terminal device. In other words, the terminal device converts the SAR margin into the maximum uplink duty cycle capacity by using the maximum transmitting power $P_{max}$.

Method 2: the maximum uplink duty cycle capacity is determined based on the terminal electromagnetic radiation margin at the end time of the current statistical window and a current transmitting power of the terminal device.

Referring to FIG. 9, the terminal device performs 4 uplink transmissions within the first statistical window. The maximum uplink duty cycle capacity is determined based on the SAR margin at the end of the current, i.e., 4th, uplink transmission and the transmitting power P4 of the 4th uplink transmission of the terminal device. In other words, the terminal device converts the SAR margin into the maximum uplink duty cycle capacity by using the current transmitting power P4.

Method 3: the maximum uplink duty cycle capacity is determined based on the terminal electromagnetic radiation margin at the end time of the current statistical window and a transmitting power of a next uplink transmission for which the terminal device is scheduled.

Referring to FIG. 9, the terminal device performs 4 uplink transmissions within the first statistical window. The maximum uplink duty cycle capacity is determined based on the terminal electromagnetic radiation margin at the end of the current, i.e., 4th, uplink transmission and the transmitting power P5 of the next uplink transmission for which the terminal device is scheduled, i.e., of the 5th uplink transmission in the second statistical window. In other words, the terminal device converts the SAR margin into the maximum uplink duty cycle capacity by using the next transmitting power P5.

In the embodiment of the present disclosure, the terminal device converts the terminal electromagnetic radiation margin into the corresponding maximum uplink duty cycle capacity and reports the maximum uplink duty cycle capacity to the network device. The network device can schedule the terminal device to perform uplink transmissions in the next statistical window according to the maximum uplink duty cycle capacity. For example, as shown in FIG. 9, the network device schedules subsequent uplink transmissions of the terminal device, for example, schedules uplink transmissions at T5 to T7 in a second statistical window, according to the maximum uplink duty cycle capacity reported by the terminal device at the end time of the first statistical window including T1 to T4.

Further, for the uplink transmitting powers at T5 to T7 in the second statistical window, the terminal device will continue to statistically obtain a new SAR margin according to the method described above for T1 to T4 in the first statistical window, and converts the new SAR margin into a new maximum uplink duty cycle capacity and reports the new maximum uplink duty cycle capacity to the network. By repeating the operations for the third, fourth and more subsequent statistical windows, dynamic reporting of the maximum uplink duty cycle capacity of the terminal device can be achieved.

For example, the one or more statistical windows include a first statistical window and a second statistical window, and the first statistical window is adjacent to or partially overlaps the second statistical window (reference can be made to the fixed window and the sliding window in Embodiment 1).

The terminal device transmits a first maximum uplink duty cycle capacity to the network device at an end time of the first statistical window, and the first maximum uplink duty cycle capacity corresponds to a terminal electromagnetic radiation margin at the end time of the first statistical window.

The terminal device transmits a second maximum uplink duty cycle capacity to the network device at an end time of the second statistical window, and the second maximum uplink duty cycle capacity corresponds to a terminal electromagnetic radiation margin at the end time of the second statistical window.

In the embodiment of the present disclosure, the length of each statistical window is a second predetermined length. The second predetermined length may be smaller than the first predetermined length of the statistical window in the Embodiment 1. For example, if a statutory time length of 4 minutes is used as the first predetermined length, the second predetermined length of the statistical window in Embodiment 2 may be several seconds or several milliseconds, so as to implement dynamic and timely statistical calculation and reporting of the maximum uplink duty cycle capacity of the terminal.

In the embodiments of the present disclosure, the condition for the terminal device to perform the power back-off and recalculate the statistical terminal electromagnetic radiation value may be that the uplink duty cycle for scheduling in the subsequent statistical window exceeds the maximum uplink duty cycle capacity reported at the end time of the previous statistical window; or the terminal electromagnetic radiation margin is insufficient. Specific examples are as follows.

For a third statistical window and a fourth statistical window in the one or more statistical windows, the third statistical window is adjacent to or partially overlaps the fourth statistical window.

The terminal device reduces the transmitting power and recalculates the statistical electromagnetic radiation value, when an uplink duty cycle for scheduling the terminal device in the fourth statistical window is larger than a maximum uplink duty cycle capacity transmitted at an end time of the third statistical window.

The terminal device reduces the transmitting power and recalculates the statistical electromagnetic radiation value, when a current statistical electromagnetic radiation value margin is smaller than or equal to a predetermined value.

In at least one embodiment, when the total length of the accumulated statistical window exceeds the statutory length, the terminal device should also reduce the transmitting power and recalculate the terminal electromagnetic radiation value.

The maximum uplink duty cycle capacity of the terminal device in the embodiments of the present disclosure is updated over time, rather than a static capacity report. As such, it can be reported more flexibly, helping to improve an overall system performance.

Embodiment 3

Based on the foregoing Embodiment 1 and Embodiment 2, the present disclosure provides Embodiment 3. Specifically, the predetermined condition for triggering the terminal device to transmit the first information to the network device includes that a statistical electromagnetic radiation value of the terminal device reaches a first threshold value.

The first information includes the power back-off value and the maximum uplink duty cycle capacity of the terminal device. The maximum uplink duty cycle capacity is a maximum uplink duty cycle capacity for uplink transmission when the statistical electromagnetic radiation value of the terminal device reaches the first threshold value, that is, the maximum uplink duty cycle capacity when the trigger condition is satisfied. The specific method of statistically obtaining the electromagnetic radiation value, the calculation method of power back-off value, the report timing, the conversion method of the maximum uplink duty cycle capacity, the configuration method of the first timer and the second timer, and the like, can all be implemented in Embodiment 3 by making reference to the description in Embodiment 1 and Embodiment 2.

Based on Embodiment 3 of the present disclosure, when the trigger condition for reporting the power back-off value is satisfied, the terminal device not only reports the power back-off value to the network device, but also reports the current maximum uplink duty cycle capacity to the network device. That is, when the terminal device reports the power back-off value, the terminal device also reports an available maximum uplink duty cycle capacity in the subsequent time window to the network device.

Accordingly, in order to avoid a link failure due to an excessive power back-off value, the network device may take a variety of measures, such as the measures described in Embodiment 1 and Embodiment 2. By reducing the transmitting power of the terminal device, or reducing the transmitting duration of the terminal device according to the reported updated maximum uplink duty cycle capacity, the network device can reasonably schedule the uplink transmission of the terminal device to the maximum extent.

The specific arrangement and implementation of the embodiments of the present disclosure are described above from different perspectives by way of a plurality of embodiments. With at least one of the above embodiments, when performing the power back-off, the terminal device can maintain a connection of the communication link with the assistance of the network device.

It should be noted that the above embodiments and the implementations in the embodiments can be freely combined to form a new embodiment unless a contradiction is incurred.

Figure 10:
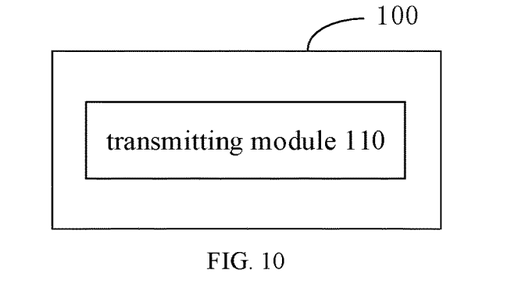
FIG. 10 is a schematic block diagram of a structure of a terminal device according to an embodiment of the present disclosure.

Corresponding to the processing method of at least one embodiment described above, an embodiment of the present disclosure further provides a terminal device 100. As illustrated in FIG. 10, the terminal device 100 includes a transmitting module 110.

The transmitting module 110 is configured to transmit first information to a network device when a predetermined condition is met. The first information includes a power back-off value and/or a maximum uplink duty cycle capacity of the terminal device.

In at least one embodiment of the present disclosure, the terminal device 100 further includes a first canceling module.

The first canceling module is configured to cancel transmission of the first information by the transmitting module when the power back-off value is smaller than or equal to a second threshold value. The second threshold is predetermined or is configured by a network device.

In at least one embodiment of the present disclosure, the terminal device 100 further includes a second canceling module.

The second canceling module is configured to cancel transmission of the first information by the transmitting module when a difference value between the power back-off value and an immediately previous power back-off value transmitted by the transmitting module is smaller than or equal to a third threshold value. The third threshold is predetermined or is configured by a network device.

In at least one embodiment of the present disclosure, the terminal device 100 includes a first timer, and the terminal device further includes a third canceling module.

The third canceling module is configured to cancel transmission of the first information by the transmitting module when the first timer is in an activated state. The first timer is predetermined or is configured by a network device.

In at least one embodiment of the present disclosure, the terminal device 100 further includes a determining module.

The determining module is configured to determine a statistical electromagnetic radiation value based on transmission process parameters. The transmission process parameters include one or more transmitting power values and corresponding transmitting durations within one or more statistical windows.

Figure 11:
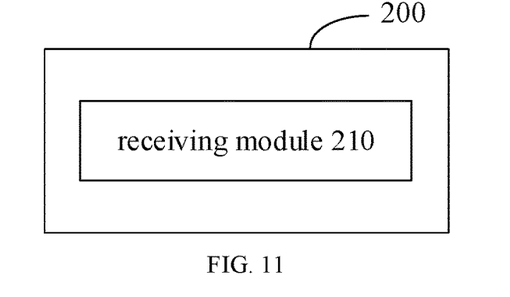
FIG. 11 is a schematic block diagram of a structure of a network device according to an embodiment of the present disclosure.

Corresponding to the processing method of at least one embodiment described above, an embodiment of the present disclosure further provides a network device 200. As illustrated in FIG. 11, the network device 200 includes a receiving module 210.

The receiving module 210 is configured to receive first information transmitted by a terminal device. The first information includes a power back-off value and/or a maximum uplink duty cycle capacity of the terminal device.

In at least one embodiment of the present disclosure, the first information includes a power back-off value of the terminal device, and the network device 200 further includes a scheduling module, a reducing module and a handover module.

The scheduling module is configured to schedule the terminal device to perform a next uplink transmission at a transmitting power smaller than or equal to a safe power when the power back-off value is greater than a first threshold value.

The reducing module is configured to reduce an uplink duty cycle for scheduling the terminal device in a next statistical window to be smaller than or equal to a safe uplink duty cycle when the power back-off value is greater than the first threshold.

The handover module is configured to hand over the terminal device to a serving cell at another frequency point when the power back-off value is greater than the first threshold.

The terminal device 100 and the network device 200 in the embodiment of the present disclosure can implement corresponding functions of the terminal device and the network device in the foregoing method embodiments. For the corresponding processes, functions, implementations, and beneficial effects of each module (sub-module, unit, or component, etc.) in the terminal device 100 and the network device 200, reference can be made to the corresponding descriptions in the foregoing method embodiments, which will not repeated here.

It should be noted that, the described functions of the modules (sub-modules, units, or components, etc.) in the terminal device 100 and the network device 200 according to the embodiment of the present disclosure may be implemented by different modules (sub-modules, units, or components, etc.), or may be implemented by the same module (sub-modules, units, or components, etc.). For example, the first canceling module and the second canceling module may be different modules, or may be a same module, and both can implement the corresponding functions of the terminal device according to the embodiment of the present disclosure.

Figure 12:
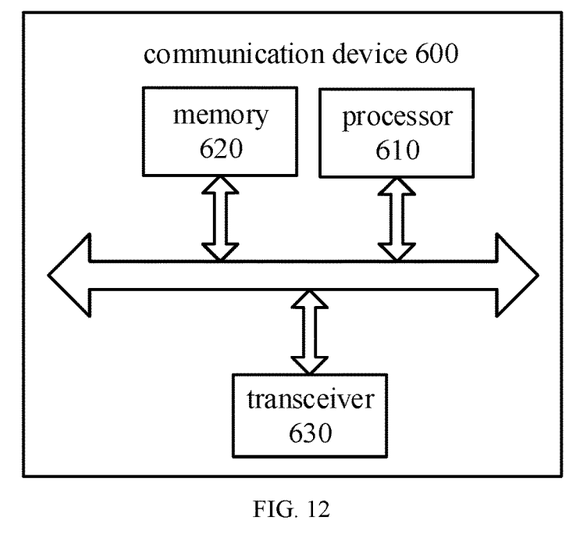
FIG. 12 is a schematic block diagram of a communication device according to an embodiment of the present disclosure.

FIG. 12 is a schematic diagram of a structure of a communication device 600 according to an embodiment of the present disclosure. The communication device 600 includes a processor 610. The processor 610 is configured to invoke and run a computer program from a memory to perform the method according to any one of the embodiments of the present disclosure.

In at least one embodiment, the communication device 600 may further include a memory 620. The processor 610 may invoke and run a computer program from the memory 620 to perform the method according to any one of the embodiments of the present disclosure.

Here, the memory 620 may be a separate component independent of the processor 610, or may be integrated in the processor 610.

In at least one embodiment, the communication device 600 may further include a transceiver 630. The processor 610 may control the transceiver 630 to communicate with other devices, specifically, to transmit information or data to other devices, or receive information or data transmitted by other devices.

Here, the transceiver 630 may include a transmitter and a receiver. The transceiver 630 may further include one or more antennas.

In at least one embodiment, the communication device 600 may be a network device according to an embodiment of the present disclosure. The communication device 600 may execute corresponding processes implemented by the network device in the method according to any one of the embodiments of the present disclosure. For brevity, details thereof will be omitted herein.

In at least one embodiment, the communication device 600 may be the terminal device according to any one of the embodiments of the present disclosure. The communication device 600 may implement corresponding processes implemented by the terminal device in the method according to any one of the embodiments of the present disclosure. For brevity, details thereof will be omitted herein.

Figure 13:
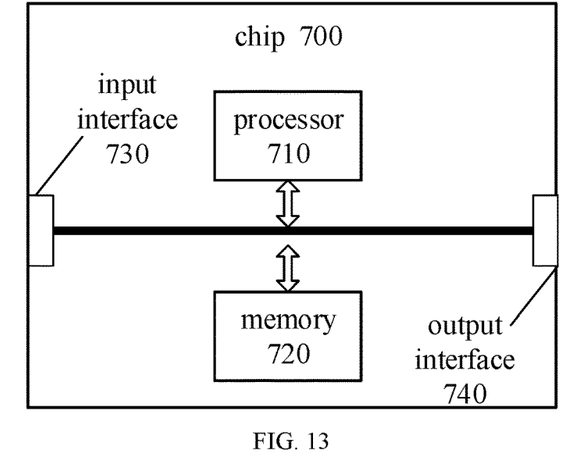
FIG. 13 is a schematic block diagram of a chip according to an embodiment of the present disclosure.

FIG. 13 is a schematic diagram of a structure of a chip 700 according to an embodiment of the present disclosure. The chip 700 includes a processor 710. The processor 710 can invoke and run a computer program from a memory to perform the method according to any one of the embodiments of the present disclosure.

In at least one embodiment, the chip 700 may further include a memory 720. The processor 710 may invoke and run a computer program from the memory 720 to perform the method according to any one of the embodiments of the present disclosure.

Here, the memory 720 may be a separate component independent of the processor 710, or may be integrated in the processor 710.

In at least one embodiment, the chip 700 may further include an input interface 730. The processor 710 can control the input interface 730 to communicate with other devices or chips, specifically, to obtain information or data transmitted by other devices or chips.

In at least one embodiment, the chip 700 may further include an output interface 740. The processor 710 can control the output interface 740 to communicate with other devices or chips, specifically, to output information or data to other devices or chips.

In at least one embodiment, the chip can be applied to the network device according to any one of the embodiments of the present disclosure. In addition, the chip can implement corresponding processes implemented by the network device in the method according to any one of the embodiments of the present disclosure. For brevity, details thereof will be omitted herein.

In at least one embodiment, the chip can be applied to the terminal device according to the embodiment of the disclosure as illustrated in FIG. 10. The chip can implement corresponding processes implemented by the terminal device in the method according to any one of the embodiments of the present disclosure. For brevity, details thereof will be omitted herein.

It should be understood that the chip mentioned in the embodiments of the present disclosure may also be referred to as a system-level chip, a system-chip, a chip system, or a system-on-chip.

The processor as mentioned above may be a general purpose processor, a Digital Signal Processor (DSP), a Field Programmable Gate Array (FPGA), an Application Specific Integrated Circuit (ASIC) or another programmable logic device, a transistor logic device, a discrete hardware component or the like. The general purpose processor as mentioned above may be a microprocessor or any conventional processor.

The memory as mentioned above may be a transitory memory or a non-transitory memory, or may include both transitory and non-transitory memories. Here, the non-transitory memory may be a Read-Only Memory (ROM), a Programmable ROM (PROM), an Erasable PROM (EPROM), an Electrically EPROM (EEPROM), or a flash memory. The transitory memory may be a Random Access Memory (RAM).

It can be appreciated that the above memories are exemplary only, rather than limiting the present disclosure. For example, the memory in the embodiment of the present disclosure may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch Link DRAM (SLDRAM), a Direct Rambus RAM (DR RAM) or the like. That is, the memory in the embodiments of the present disclosure is intended to include, but not limited to, these and any other suitable types of memories.

Figure 14:
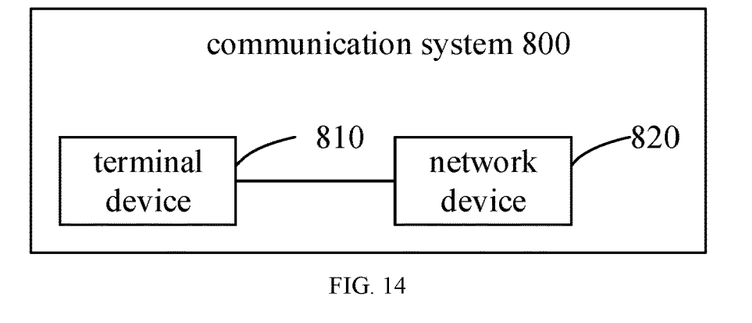
FIG. 14 is a schematic block diagram of a communication system according to an embodiment of the present disclosure.

FIG. 14 is a schematic block diagram of a communication system 800 according to an embodiment of the present disclosure. The communication system 800 includes a terminal device 810 and a network device 820.

The terminal device 810 may be configured to implement the corresponding functions implemented by the terminal device in the methods of the embodiments of the present disclosure, and the network device 820 may be configured to implement the corresponding functions implemented by the network device in the methods of the embodiments of the present disclosure. For brevity, details thereof will be omitted herein.

The above embodiments can be implemented in whole or in part by software, hardware, firmware or any combination thereof. When implemented in software, it may be implemented in whole or in part in the form of a computer program product. The computer program product includes one or more computer instructions. The procedures or functions described in accordance with the embodiments of the present disclosure are all or partially generated when the computer program instructions are loaded and executed on a computer. The computer may be a general purpose computer, a special purpose computer, a network of computers, or other programmable device. The computer instructions can be stored in a computer-readable storage medium or transmitted from one computer-readable storage medium to another computer-readable storage medium. For example, the computer instructions can be transmitted from one website, computer, server, or data center to another website, computer, server, or data center via wired (e.g., coaxial cable, fiber optic, Digital Subscriber Line (DSL)) or wireless (e.g., infrared, wireless, microwave, etc.) means. The computer-readable storage medium can be any available medium that can be accessed by a computer or a data storage device, such as a server, a data center, etc., that includes one or more available media. The usable medium may be a magnetic medium (e.g., floppy Disk, hard Disk, magnetic tape), an optical medium (e.g., DVD), or a semiconductor medium (e.g., Solid State Disk (SSD)), among others.

It should be understood that, in the various embodiments of the present disclosure, the sequence numbers of the above-mentioned processes do not imply any order of execution, and the order of execution of the processes should be determined by their functions and inherent logic, and should not constitute any limitation to the implementation process of the embodiments of the present disclosure.

Those skilled in the art can clearly understand that, for the sake of convenience and conciseness of the description, for the specific operation processes of the systems, devices, and units described above, reference can be made to the corresponding processes in the foregoing method embodiments, and details thereof will be omitted here.

While the specific embodiments of the present disclosure have been described above, the protection scope of the present disclosure is not limited to these embodiments. Various variants and alternatives can be easily conceived by any of those skilled in the art without departing from the technical scope of the present disclosure. Therefore, these variants and alternatives are to be encompassed by the protection scope of present disclosure as defined by the claims as attached.

What is claimed is:

1. A method for controlling transmitting power, applied in a terminal device, the method comprising:

transmitting, by the terminal device, first information to a network device when a predetermined condition is met, wherein the first information comprises a power back-off value; wherein the power back-off value is determined based on a first transmitting power of the terminal device, and the first transmitting power is a transmitting power when a statistical electromagnetic radiation value of the terminal device reaches a first threshold value, the power back-off value is a power back-off value when it is assumed that the terminal device is scheduled to perform uplink transmission at the first transmitting power, and the first information is transmitted at an end of uplink transmission when the statistical electromagnetic radiation value of the terminal device reaches the first threshold value; or the power back-off value is determined based on a second transmitting power of the terminal device, and the second transmitting power is a transmitting power when the terminal device is scheduled for a next uplink transmission and transmitting, by the terminal device, no first information when a difference value between the power back-off value and an immediately previous power back-off value transmitted by the terminal device is smaller than or equal to a third threshold value, wherein the third threshold is predetermined or is configured by a network device.

2. The method according to claim 1, wherein the predetermined condition comprises that a statistical electromagnetic radiation value of the terminal device reaches a first threshold value, and the first information comprises the power back-off value of the terminal device, wherein the statistical electromagnetic radiation value comprises a Maximum Permissible Emission (MPE).

3. The method according to claim 1, wherein the terminal device comprises a second timer, and the method further comprises:

transmitting, by the terminal device, the first information periodically to the network device in accordance with the second timer,
wherein the second timer is predetermined or is configured by a network device.

4. The method according to claim 1, wherein the predetermined condition comprises that an end time of each statistical window in one or more statistical windows is reached; and
the first information comprises a maximum uplink duty cycle capacity of the terminal device, wherein the maximum uplink duty cycle capacity is a maximum uplink duty cycle capacity for uplink transmission at the end time of each statistical window of the terminal device.

5. The method according to claim 1, wherein the predetermined condition comprises that a statistical electromagnetic radiation value of the terminal device reaches a first threshold value; and
the first information comprises the power back-off value and a maximum uplink duty cycle capacity of the terminal device, wherein the maximum uplink duty cycle capacity is a maximum uplink duty cycle capacity for uplink transmission when the statistical electromagnetic radiation value of the terminal device reaches the first threshold value.

6. The method according to claim 1, wherein the terminal device transmits the first information before the next uplink transmission; or
the terminal device transmits the first information at an initial time of the next uplink transmission.

7. The method according to claim 1, wherein the first information comprises a maximum uplink duty cycle capacity of the terminal device, the maximum uplink duty cycle capacity corresponds to a terminal electromagnetic radiation margin at an end time of a current statistical window in one or more statistical windows, and the terminal electromagnetic radiation margin is a difference value between a terminal electromagnetic radiation threshold value and a current statistical electromagnetic radiation value.

8. The method according to claim 7, wherein the maximum uplink duty cycle capacity is determined based on the terminal electromagnetic radiation margin at the end time of the current statistical window and a maximum transmitting power of the terminal device.

9. The method according to claim 7, wherein the maximum uplink duty cycle capacity is determined based on the terminal electromagnetic radiation margin at the end time of the current statistical window and a current transmitting power of the terminal device.

10. The method according to claim 7, wherein the maximum uplink duty cycle capacity is determined based on the terminal electromagnetic radiation margin at the end time of the current statistical window and a transmitting power of a next uplink transmission for which the terminal device is scheduled.

11. The method according to claim 7, wherein the one or more statistical windows comprise a first statistical window and a second statistical window, and the first statistical window is adjacent to or partially overlaps the second statistical window;
wherein the terminal device transmits a first maximum uplink duty cycle capacity to the network device at an end time of the first statistical window, and the first maximum uplink duty cycle capacity corresponds to a terminal electromagnetic radiation margin at the end time of the first statistical window; and
the terminal device transmits a second maximum uplink duty cycle capacity to the network device at an end time of the second statistical window, and the second maximum uplink duty cycle capacity corresponds to a terminal electromagnetic radiation margin at the end time of the second statistical window.

12. A terminal device, comprising a processor and a memory, wherein the memory is configured to store a computer program, and the processor is configured to invoke and execute the computer program stored in the memory to perform operations comprising:
transmitting, by the terminal device, first information to a network device when a predetermined condition is met, wherein the first information comprises a power back-off value; wherein
the power back-off value is determined based on a first transmitting power of the terminal device, and the first transmitting power is a transmitting power when a statistical electromagnetic radiation value of the terminal device reaches a first threshold value, the power back-off value is a power back-off value when it is assumed that the terminal device is scheduled to perform uplink transmission at the first transmitting power, and the first information is transmitted at an end of uplink transmission when the statistical electromagnetic radiation value of the terminal device reaches the first threshold value; or
the power back-off value is determined based on a second transmitting power of the terminal device, and the second transmitting power is a transmitting power when the terminal device is scheduled for a next uplink transmission and transmitting, by the terminal device, no first information when a difference value between the power back-off value and an immediately previous power back-off value transmitted by the terminal device is smaller than or equal to a third threshold value, wherein the third threshold is predetermined or is configured by a network device.

13. The terminal device according to claim 12, wherein the predetermined condition comprises that a statistical electromagnetic radiation value of the terminal device reaches a first threshold value, and the first information comprises the power back-off value of the terminal device.

14. The terminal device according to claim 12, wherein the terminal device comprises a second timer, and the operations further comprise:
transmitting, by the terminal device, the first information periodically to the network device in accordance with the second timer,
wherein the second timer is predetermined or is configured by a network device.

15. A network device, comprising a processor and a memory, wherein the memory is configured to store a computer program, and the processor is configured to invoke and execute the computer program stored in the memory to perform operations comprising:
receiving, by the network device, first information transmitted by a terminal device when a predetermined condition is met, wherein the first information comprises a power back-off value; wherein
the power back-off value is determined based on a first transmitting power of the terminal device, and the first transmitting power is a transmitting power when a statistical electromagnetic radiation value of the terminal device reaches a first threshold value, the power back-off value is a power back-off value when it is assumed that the terminal device is scheduled to perform uplink transmission at the first transmitting power, and the first information is transmitted at an end of uplink transmission when the statistical electromagnetic radiation value of the terminal device reaches the first threshold value; or the power back-off value is determined based on a second transmitting power of the terminal device, and the second transmitting power is a transmitting power when the terminal device is scheduled for a next uplink transmission and receiving, by the network device, no first information when a difference value between the power back-off value and an immediately previous power back-off value transmitted by the terminal device is smaller than or equal to a third threshold value, wherein the third threshold is predetermined or is configured by a network device.

16. The network device according to claim 15, wherein the predetermined condition comprises that a statistical electromagnetic radiation value of the terminal device reaches a first threshold value, and the first information comprises the power back-off value of the terminal device, wherein the statistical electromagnetic radiation value comprises a Maximum Permissible Emission (MPE).

17. The network device according to claim 15, wherein the terminal device comprises a second timer, and the operations further comprise:

receiving, by the network device, the first information periodically transmitted by the terminal device in accordance with the second timer, wherein the second timer is predetermined or is configured by a network device.

* * * * *